United States Patent
Jacobsson

(10) Patent No.: US 11,040,371 B2
(45) Date of Patent: *Jun. 22, 2021

(54) PRODUCTION METHOD

(71) Applicant: VALINGE INNOVATION AB, Viken (SE)

(72) Inventor: Jan Jacobsson, Landskrona (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,289

(22) Filed: Apr. 26, 2019

(65) Prior Publication Data

US 2020/0078825 A1    Mar. 12, 2020

Related U.S. Application Data

(63) Continuation of application No. 13/118,846, filed on May 31, 2011, now Pat. No. 10,315,219.

(Continued)

(51) Int. Cl.
*B05D 5/06* (2006.01)
*B32B 37/24* (2006.01)
*B44C 5/04* (2006.01)
*B44F 5/00* (2006.01)
*B05D 3/02* (2006.01)
(Continued)

(52) U.S. Cl.
CPC ............... *B05D 5/06* (2013.01); *B32B 37/24* (2013.01); *B44C 5/043* (2013.01); *B44F 5/00* (2013.01); *B05D 3/0254* (2013.01); *B05D 3/0473* (2013.01); *B05D 3/12* (2013.01); *B05D 2401/32* (2013.01); *B32B 2307/554* (2013.01); *B32B 2310/049* (2013.01); *B32B 2317/125* (2013.01); *B32B 2317/16* (2013.01); *B32B 2607/00* (2013.01); *Y10T 428/24893* (2015.01)

(58) Field of Classification Search
None
See application file for complete search history.

(56) References Cited

U.S. PATENT DOCUMENTS 2,587,064 A    2/1952  Rapson
2,831,793 A    4/1958  Elmendorf
(Continued)

FOREIGN PATENT DOCUMENTS

AU    80284/75    6/1975
CA    2 557 096 A1    7/2005
(Continued)

OTHER PUBLICATIONS

International Search Report and Written Opinion issued in corresponding PCT/SE2011/050679 dated Sep. 30, 2011, ISA/SE patentoch registreringsverket, Stockholm, SE, 14 pages.
(Continued)

*Primary Examiner* — Alexander M Weddle
(74) *Attorney, Agent, or Firm* — Buchanan Ingersoll & Rooney P.C.

(57) ABSTRACT

A method for producing a panel including a core and a decorative surface layer is disclosed. The method includes the step of applying a dry powder layer on the core. The method includes the step of applying steam on a dry powder layer on the core. Thereafter heat and pressure are applied to the powder layer in order to bond the powder together.

26 Claims, 3 Drawing Sheets

Related U.S. Application Data

(60) Provisional application No. 61/349,950, filed on May 31, 2010.

(51) Int. Cl.
*B05D 3/04* (2006.01)
*B05D 3/12* (2006.01)

(56) References Cited

U.S. PATENT DOCUMENTS

| | | |
|---|---|---|
| 2,962,081 A | 11/1960 | Dobry et al. |
| 3,032,820 A | 5/1962 | Johnson |
| 3,135,643 A | 6/1964 | Michl |
| 3,164,648 A | 1/1965 | Franksson |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,897,588 A | 7/1975 | Nohtomi |
| 3,914,359 A | 10/1975 | Bevan |
| 3,946,495 A * | 3/1976 | Osdor ............. F26B 17/1483 34/413 |
| 3,961,108 A | 6/1976 | Rosner et al. |
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,374,175 A * | 2/1983 | Tanaka ............. A61C 9/0033 428/369 |
| 4,420,525 A | 12/1983 | Parks |
| 4,430,375 A | 2/1984 | Scher et al. |
| 4,434,129 A * | 2/1984 | Bose ............. B29C 48/10 264/557 |
| 4,473,593 A * | 9/1984 | Sturgeon ............. A23B 9/025 426/461 |
| 4,474,920 A | 10/1984 | Kyminas et al. |
| 4,844,764 A | 7/1989 | Nablo |
| 4,890,656 A | 1/1990 | Ohsumi et al. |
| 5,034,272 A | 7/1991 | Lindgren et al. |
| 5,206,066 A | 4/1993 | Horacek |
| 5,246,765 A | 9/1993 | Lussi et al. |
| 5,258,216 A | 11/1993 | Von Bonin et al. |
| 5,314,554 A | 5/1994 | Owens |
| 5,422,170 A | 6/1995 | Iwata et al. |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,296 A | 7/1999 | Leese |
| 5,942,072 A | 8/1999 | McKinnon |
| 5,977,244 A | 11/1999 | Kohlhammer |
| 6,036,137 A | 3/2000 | Myren |
| 6,103,377 A | 8/2000 | Clausi |
| 6,238,750 B1 | 5/2001 | Correll et al. |
| 6,468,645 B1 | 10/2002 | Clausi |
| 6,521,326 B1 | 2/2003 | Fischer et al. |
| 6,537,610 B1 | 3/2003 | Springer et al. |
| 6,620,349 B1 | 9/2003 | Lopez |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0208980 A1 | 11/2003 | Miller et al. |
| 2004/0123542 A1 | 7/2004 | Grafenauer |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2005/0003099 A1 | 1/2005 | Quist |
| 2005/0079780 A1 | 4/2005 | Rowe et al. |
| 2005/0193677 A1 | 9/2005 | Vogel |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |

(56) References Cited

U.S. PATENT DOCUMENTS

| | | |
|---|---|---|
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0203604 A1 | 8/2008 | Lalancette |
| 2008/0263985 A1 | 10/2008 | Hasch et al. |
| 2009/0056257 A1 | 3/2009 | Mollinger et al. |
| 2009/0110869 A1* | 4/2009 | Streeton ............... D06N 7/0071 428/90 |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1* | 10/2011 | Pervan ................. B44C 5/0476 428/173 |
| 2011/0262720 A1 | 10/2011 | Riebel et al. |
| 2011/0262733 A1 | 10/2011 | Roosen et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Persson et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0221397 A1 | 7/2020 | Hedlund et al. |
| 2020/0223197 A1 | 7/2020 | Hedlund et al. |

FOREIGN PATENT DOCUMENTS

| | | |
|---|---|---|
| CA | 2 852 656 A1 | 4/2013 |
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2006 007 797 U1 | 8/2006 |
| DE | 10 2005 046 264 A1 | 4/2007 |
| DE | 10 2006 024 593 A1 | 12/2007 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 592 013 A2 | 4/1994 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 | 9/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 681 103 A2 | 7/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | H0 2-229002 A | 9/1990 |

(56) References Cited

FOREIGN PATENT DOCUMENTS

| JP | 11-291203 A | 10/1999 |
|---|---|---|
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/054600 A1 | 6/2005 |
| WO | WO 2005/066431 A2 | 7/2005 |
| WO | WO 2005/097874 A2 | 10/2005 |
| WO | WO 2006/007413 A1 | 1/2006 |
| WO | WO 2006/013469 A1 | 2/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO-2009065769 A2 * | 5/2009 ............... B32B 3/30 |
| WO | WO 2009/080813 A1 | 7/2009 |
| WO | WO 2009/116926 A1 | 9/2009 |
| WO | WO 2009/124704 A1 | 10/2009 |
| WO | WO 2010/087752 A1 | 8/2010 |
| WO | WO 2010/094500 A1 | 8/2010 |
| WO | WO 2011/129757 A1 | 10/2011 |
| WO | WO 2011/141851 A2 | 11/2011 |
| WO | WO 2012/004699 A2 | 1/2012 |

OTHER PUBLICATIONS

Extended European Search Report issued in EP 11790091, dated Apr. 8, 2014, European Patent Office, Munich, DE, 5 pages.
Parquet International, "Digital Printing is still an expensive process," Mar. 2008, cover p./pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE.
Odian, George, "Principles of Polymerization," 1991, $3^{rd}$ Edition, 5 pages incl. pp. 122-123, John Wiley & Sons, Inc., New York, NY, USA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.

* cited by examiner

PRODUCTION METHOD

CROSS REFERENCE TO RELATED APPLICATIONS

The present application is a continuation of U.S. application Ser. No. 13/118,846, filed on May 31, 2011, which claims the benefit of U.S. Provisional Application No. 61/349,950, filed on May 31, 2010. The entire contents of each of U.S. application Ser. Nos. 13/118,846 and 61/349,950 are hereby incorporated by reference herein.

TECHNICAL FIELD

The disclosure generally relates to a method for producing a fibre-based building panel, preferably a floor panel, and to a building panel produced by said method.

BACKGROUND

A new type of panel called Wood Fiber Floor (WFF) is disclosed in WO2009/065769, which shows both products and methods to produce such a panel. Further methods and production equipments are disclosed in WO2009/124704.

The WFF floor panels are produce by applying a dry powder mix on a HDF core. The powder mix is bonded together under heat and pressure to form a decorative surface layer.

In order to stabilize the dry powder mix the production methods in WO2009/065769 or in WO2009/124704 (see page 15, line 15-21; FIG. 3) uses spraying of pure water or water with additives.

The entire contents of WO2009/065769 and WO2009/124704 are hereby incorporated by reference herein, and with a specific reference to page 15, line 15-21 and FIG. 3 of WO2009/124704.

SUMMARY OF THE DISCLOSURE

An objective of embodiments of the disclosure is to provide production methods that are more effective than the present known technology. Another objective is to produce panels with a more uniform colour or a more controlled colour variation and/or pattern.

When pressing a surface layer out of powder mix—such as a WFF mixture disclosed in WO2009/065769 or in WO2009/124704—one problem is to avoid that the powder mixture completely or partly blows off when the board is handled in the line before pressing and/or blow out of the press when the air is evacuated due to the closing of the press.

The known solutions to stabilize the powder by using spraying of water has the disadvantage that it is difficult to control the distribution of the water and to avoid water drops unintentionally falling down on the powder layer from the spraying unit.

An uneven water distribution and/or unintentional water drops normally have a negative effect of the visual as well as technical properties of the product. Furthermore, a waiting time to let the water penetrate into the powder before entering the press slow down the press cycle and to total out put from the production line is lowered.

A first aspect of the disclosure is a method of manufacturing a panel comprising a core (1) and a decorative surface layer (4) comprising the steps of:
Applying a dry powder layer (2) on a core (1); and
Applying steam to the powder layer.

The steam is preferably a water steam, most preferably a substantially pure water steam, even though the steam may comprise one or more additives. Examples of additives are wetting agents, releasing agents and/or colour additives.

The dry powder layer is preferably a mix of fibres, preferably wood fibres, and binder(s). The powder layer may also include wear resistant particles, preferably aluminium oxide.

The core is preferably a wood fibre based core, preferably an HDF panel.

A second aspect of the disclosure is a method of manufacturing a panel comprising a core (1) and a surface layer (4) with a designed pattern comprising the steps of:
Applying a dry powder layer (2) on a core (1); and
Creating a pattern by applying steam to parts of the powder layer or applying steam unevenly (e.g., over all of the powder layer, but in different amounts) over the powder layer.

The steam in the first and the second aspect is preferably a water steam, most preferably a substantially pure water steam, even though the steam may comprise one or more additives. The steam may be a mist or the gas phase of water (water vapour), preferably a saturated vapour and most preferably a saturated vapour mainly comprising water.

Preferred embodiments of the first and second aspects of the disclosure are disclosed below.

A third aspect of the disclosure is a panel produced according to any one the aspects above.

The methods above may be used to any production of a building panel in which a dry powder layer is applied to a core.

BRIEF DESCRIPTION OF THE DRAWINGS

The disclosure will in the following be described in connection to exemplary embodiments and in greater detail with reference to the appended exemplary drawings, wherein.

DETAILED DESCRIPTION OF EMBODIMENTS

Figure 1:
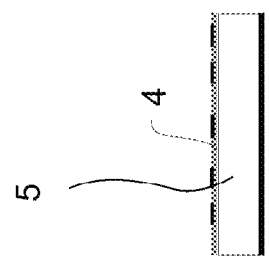
FIG. 1 Illustrates a production line and a method according to an embodiment of the disclosure.
Figure 1:
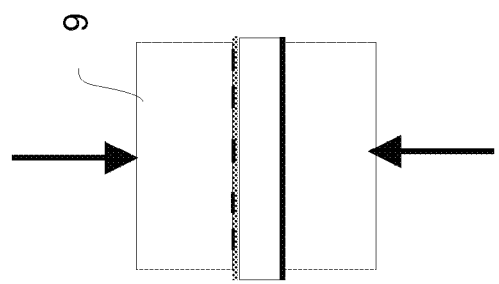
Figure 1:
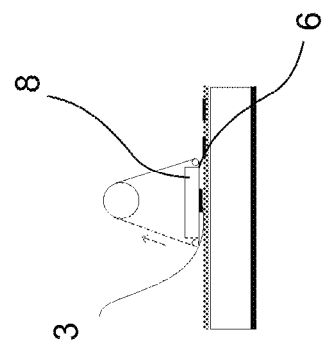
Figure 1:
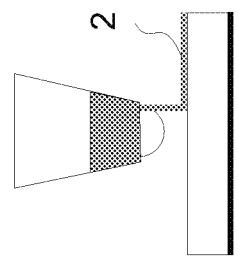
Figure 1:
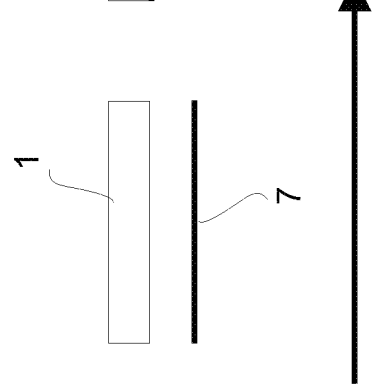

In FIG. 1 an embodiment of a production line is disclosed for producing a panel 5 with a decorative layer 4. A dry powder mix 2 is applied by scattering on a core 1, preferably an HDF core. The powder mix is stabilized by applying steam 3 before the powder mix is bonded together by applying heat and pressure in, for example, a press 9. If a pattern is desired, the steam may in one embodiment, be applied through a template 6, preferably rotating. In a preferred embodiment also a balancing layer 7 is applied to the core.

In the methods according to the present disclosure preferably the same scattering and pressing units as disclosed in WO2009/065769 or in WO2009/124704 are used.

In one embodiment the steam is applied by using a steam box 8, a box with one or more outlets at the bottom for steam, positioned above the transportation belt. The box preferably extends across the panel with a uniform width. An even moisture distribution is applied over the surface of the scattered powder layer 2, when the board pass under the steam box. Since the steam penetrate into the powder very effectively it is possible to immediately move the board into the press and close the press 9.

A suitable steam box is either fed by an external steam generator or the steam is generated in the steam box itself. It is suitable that that the steambox is equipped with one or several layers of nets for example mesh and/or sheets with holes to even out the steam concentration close to the powder layer.

Figure 2A:
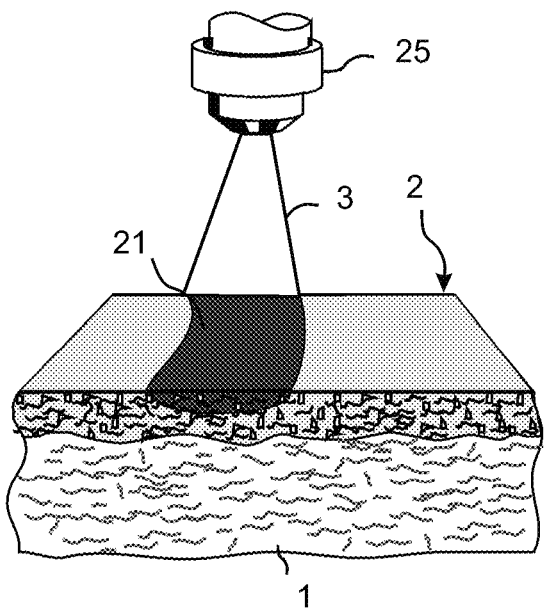
FIGS. 2*a*-2*b* Illustrate a method for creating a design according to an embodiment of the disclosure.
Figure 2B:
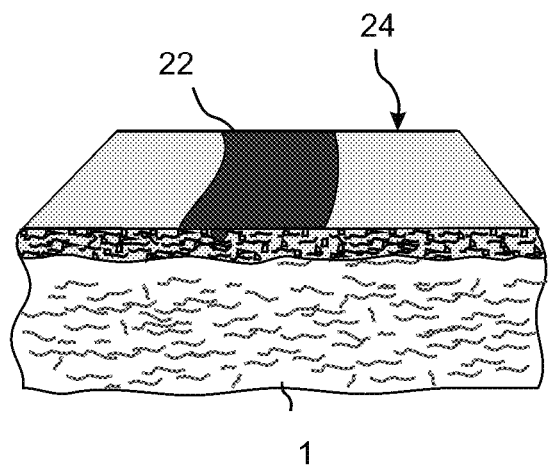

FIGS. 2a and 2b shows how an uneven distribution of moisture 21, obtained by applying steam 3 through, e.g., a nozzle 25, can be used for design effect purpose. Different amount of moisture 21 in different parts of a single colour powder, but not yet pressed, surface gives a visual colour difference of the different parts. By controlling where on the surface the moisture content is higher a wanted design effect 22 can be generated (see FIG. 2b) in the pressed surface 24 of the panel even if only one unicolored powder layer is applied on the core 1.

By controlling the relative movement between a core 1 with the powder mix layer 2 and one or several steam outlets a controlled variation of the content of moisture 21 in the powder can be achieved. This variation of moisture content will after pressing be visible as color differences 22 on the ready surface 24.

One or several of the steam outlets could be fixed on a robot arm and their position in relation to the scattered board could then be controlled in all directions.

Figure 3:
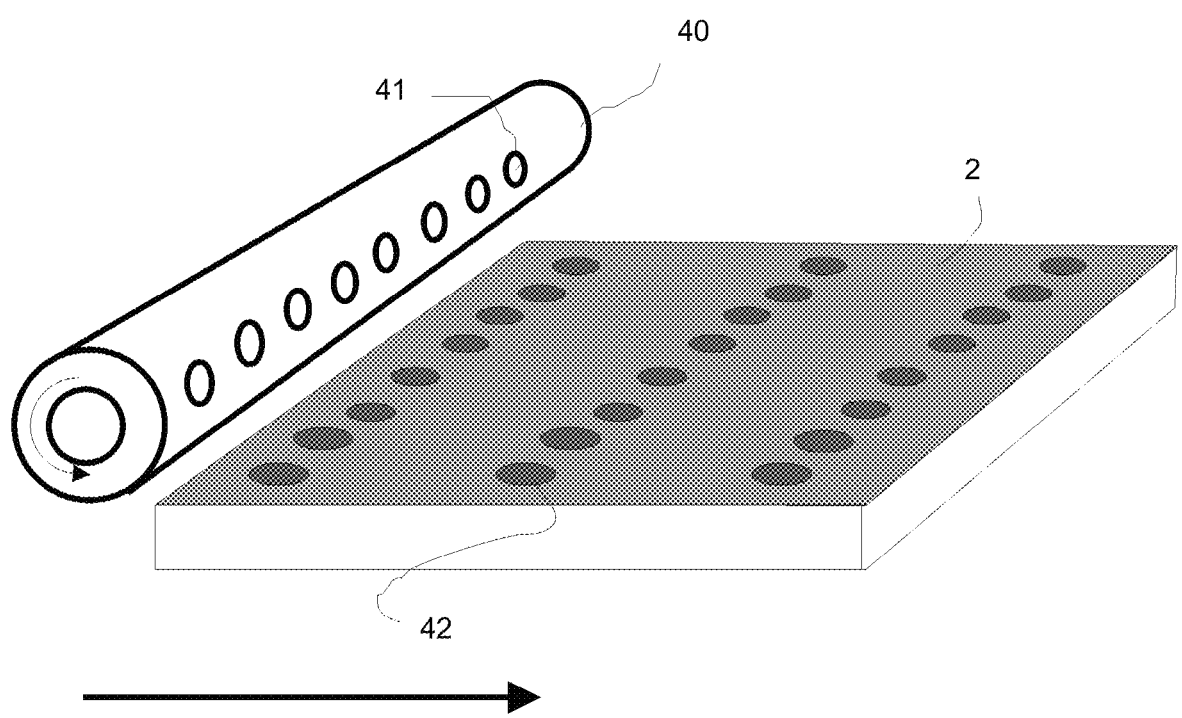
FIG. 3 Illustrates a method for creating a design according to an embodiment of the disclosure.

The steam outlets 41 could be positioned in a rotating device, preferably a steam pipe 40, to generate a controlled moisture variation 42 in the powder layer 2, see FIG. 3.

As a Non-Limiting Example, the Steps for Producing a WFF Board could be as Follows:
1) Place a balancing layer, e.g. a paper impregnated with a thermosetting resin or a mixture of wood powder and thermosetting resin is placed on a transportation belt. A typical balancing layer is two sheets of DKB 140 paper.
2) Place a wood fibre board, typically an about 10 mm thick HDF board with a density of typically about 900 kg/m3, on top of the balancing layer.
3) Moving the balancing layer and board in a speed of 1-10 m/min (a typical value is about 3 m/min) under a scattering machine were a premade mixture of wood fibres, binders, hard particles and pigments are scattered on top of the board. The powder applied can be in the range of about 100-1000 g/m2. Typical value is about 700 g/m2.
4) Moving the board, with a balancing layer on the backside and a scattered powder layer on the top side, through a steam box with even steam concentration in the speed of 1-10 m/min (typical value is about 3 m/min) where steamed water, with or without additives, penetrates into the powder and stabilize it to improve further handling and to avoid that the powder blows out when the press is closing. Typical amount of moisture applied by the steam box is 3 g/m2.
5) Bringing the board with a balancing layer on the backside and a scattered and steam stabilized powder layer on the top side into the press.
6) Closing the press, and curing the thermosetting resin in the balancing layer and the powder layer under heat and pressure. Typical press parameters are 30 seconds pressing (range is, for example, 8-60 seconds). 40 bars pressure (range is, for example, 30-60 bars) may be applied on the board. Temperature of typically about 170 degrees C. (range is, for example, 150-220 degrees C.) on the top and bottom press plates. The pressing surfaces of the press plates can be even or have structure. Structure depth typically about 0.5 mm (range for example about 0-1.5 mm).

In an alternative example also one or more paper sheets are applied after step 4.

An Example of a Production of a WFF Board with a Designed Pattern by Controlled Uneven Moisture Distribution:
1) Place a balancing layer, e.g. a paper impregnated with a thermosetting resin or a mixture of wood powder and thermosetting resin is placed on a transportation belt. A typical balancing layer is two sheets of DKB 140 paper.
2) Place a wood fibre board, typically an about 10 mm thick HDF board with a density of typically about 900 kg/m3, on top of the balancing layer.
3) Moving the balancing layer and board in a speed of about 1-10 m/min (typical value is about 3 m/min) under a scattering machine were a premade mixture of wood fibres, binders, hard particles and pigments are scattered on top of the board. The powder applied can be in the range of about 100-1000 g/m2. Typical value is about 700 g/m2.
4) Moving the board, with a balancing layer on the backside and a scattered powder layer on the top side, under one or several steam outlets that also might move sideways and open and close during the board passing time, in the speed of about 1-10 m/min (typical value is about 3 m/min) where steamed water, with or without additives, penetrates into the powder in an uneven but controlled way to obtain a variation in the moisture content in the powder layer.
5) Bringing the board with a balancing layer on the backside and a scattered and steam stabilized powder layer on the top side into the press.
6) Closing the press, and curing the thermosetting resin in the balancing layer and the powder layer under heat and pressure. The different moisture content resulting in a visible design effect in the ready pressed board. Typical press parameters are about 30 seconds pressing (range is, for example, about 8-60 seconds). About 40 bars pressure (range is, for example, 30-60 bars) may be applied on the board. Temperature of typically about 170 degrees C. (range is, for example, about 150-220 degrees C.) on the top and bottom press plates. The pressing surfaces of the press plates can be even or have structure. Structure depth typically value about 0.5 mm (range for example about 0-1.5 mm).

In an alternative example also one or more paper sheets are applied after step 4.

The invention claimed is:

1. A method comprising:
applying a dry powder layer on a core, the dry powder layer comprising a mix of wood fibers and a binder;
subsequently applying steam directly onto the dry powder layer while the dry powder layer is on the core to form a stabilized powder layer on the core; and
subsequently bonding the powder in the stabilized powder layer together into a cured layer by applying heat and pressure, and thereby forming a panel comprising the core and the cured layer.

2. The method as claimed in claim 1, wherein the steam is a saturated vapour consisting essentially of water.

3. The method as claimed in claim 1, wherein the steam comprises one or more additives.

4. The method as claimed in claim 1, wherein the core is a wood fibre based core.

5. The method as claimed in claim 1, wherein the core is an HDF panel.

6. The method as claimed in claim 1, wherein the formed panel is a building panel.

7. The method as claimed in claim 1, wherein the formed panel is a floor panel.

8. The method as claimed in claim 1, wherein the mix of the dry powder layer further comprises wear resistant particles.

9. The method as claimed in claim 1, wherein the mix of the dry powder layer further comprises aluminium oxide.

10. The method as claimed in claim 1, wherein the mix of the dry powder layer further comprises pigments.

11. The method as claimed in claim 1, wherein the mix of the dry powder layer further comprises wear resistant particles and pigments, and wherein the binder is a thermosetting resin.

12. The method as claimed in claim 1, wherein the binder is a thermosetting resin.

13. The method as claimed in claim 1, wherein a thickness of the cured layer is less than about 1 mm.

14. The method as claimed in claim 1, wherein a thickness of the cured layer is less than about 0.3 mm.

15. The method as claimed in claim 1, wherein the cured layer is a surface layer of the panel.

16. The method as claimed in claim 1, wherein the cured layer is a decorative surface layer of the panel.

17. The method as claimed in claim 1, wherein the steam is applied with a steam box.

18. The method as claimed in claim 1, wherein the dry powder layer is applied by scattering.

19. The method as claimed in claim 1, wherein heat and pressure are applied by a press.

20. The method as claimed in claim 1, wherein the press is operated with the following parameters: 8-60 seconds of pressing time; 30-60 bars of applied pressure; and 150-220° C. of pressing temperature.

21. The method as claimed in claim 1, wherein the steam is applied to the dry powder layer when the core is moving at a speed of 1 to 10 meters per minute.

22. The method as claimed in claim 1, wherein the steam is substantially uniformly applied over the dry powder layer.

23. A method comprising:

applying a dry powder layer on a core, the dry powder layer comprising a mix of wood fibers and a binder;

subsequently applying steam directly onto the dry powder layer while the dry powder layer is on the core to form a stabilized powder layer on the core; and subsequently bonding the powder in the stabilized powder layer together into a cured layer by applying heat and pressure, and thereby forming a panel comprising the core and the cured layer, wherein the steam comprises one or more additives selected from the group consisting of wetting agents, releasing agents, and colour additives.

24. A floor panel produced according to the method in claim 1.

25. A floor panel produced according to the method in claim 11.

26. A floor panel produced according to the method in claim 22.

* * * * *